(12) United States Patent
Jo

(10) Patent No.: US 8,794,581 B2
(45) Date of Patent: Aug. 5, 2014

(54) CLIP FOR CONSTRUCTION MACHINERY, HAVING A LATCH THAT MOVES IN MULTIPLE DIRECTIONS

(75) Inventor: Young-Chul Jo, Changwon-si (KR)

(73) Assignee: Volvo Construction Equipment AB (SE)

(*) Notice: Subject to any disclaimer, the term of this patent is extended or adjusted under 35 U.S.C. 154(b) by 0 days.

(21) Appl. No.: 13/807,113

(22) PCT Filed: Jul. 1, 2010

(86) PCT No.: PCT/KR2010/004263
§ 371 (c)(1),
(2), (4) Date: Dec. 27, 2012

(87) PCT Pub. No.: WO2012/002592
PCT Pub. Date: Jan. 5, 2012

(65) Prior Publication Data
US 2013/0099079 A1    Apr. 25, 2013

(51) Int. Cl.
*A47G 1/10*    (2006.01)
(52) U.S. Cl.
USPC ......... 248/316.7; 439/557; 439/544; 439/555
(58) Field of Classification Search
USPC .......... 248/231.9, 316.1, 316.7, 228.7, 230.7, 248/229.26, 231.81; 439/557, 567, 563, 439/562, 558, 570, 544, 555; 24/455, 470, 24/472, 467
See application file for complete search history.

(56) References Cited

U.S. PATENT DOCUMENTS

| 5,895,289 | A  | * | 4/1999 | Smith ............................ 439/553 |
| 6,368,152 | B1 | * | 4/2002 | Takeguchi ..................... 439/557 |
| 7,077,698 | B2 | * | 7/2006 | Matthys et al. ............... 439/557 |
| 7,749,015 | B2 | * | 7/2010 | Uchikawa et al. ............ 439/362 |
| 2005/0202719 | A1 | | 9/2005 | Matthys et al. |

FOREIGN PATENT DOCUMENTS

| JP | 9-306600 A | 11/1997 |
| JP | 2005-259698 A | 9/2005 |
| KR | 20-0320758 | 7/2003 |
| KR | 10-0830696 B1 | 5/2008 |

OTHER PUBLICATIONS

International Search Report (in Korean and English) and Written Opinion (in Korean) for PCT/KR2010/004263, mailed Apr. 28, 2011; ISA/KR.
International Preliminary Report on Patentability (Chapter II) with one page Annex (in Korean), mailed Oct. 23, 2012; IPEA/KR (with English Translation of Annexed Claims).

* cited by examiner

*Primary Examiner* — Todd M Epps
(74) *Attorney, Agent, or Firm* — Harness, Dickey & Pierce, P.L.C.

(57) ABSTRACT

A clip for a construction machine is provided, which prevents the damage of a fastening structure of a connector and facilitates the release of the connector when the connector is fastened to the clip using a connector fastening structure having the same shape in upper, lower, left, and right directions and a moving latch provided in the clip, in the case where the connector that is included in various kinds of wires and signal cables is mounted using the clip that is fixed to a structure of a vehicle of the construction machine. In addition, the clip has a structure whereby two connectors can be simultaneously fastened to one click using the fastening structure having the same shape, and the connector can be fixed to the clip in a desired direction without twisting of the wires using the fastening structure having the same shape in left and right directions.

2 Claims, 5 Drawing Sheets

CLIP FOR CONSTRUCTION MACHINERY, HAVING A LATCH THAT MOVES IN MULTIPLE DIRECTIONS

CROSS-REFERENCE TO RELATED APPLICATIONS

This is a U.S. National Stage Application of International Application No. PCT/KR2010/004263, filed on Jul. 1, 2010 and published in Korean as WO 2012/002592 on Jan. 5, 2012. The disclosure of the above applications is incorporated herein by reference.

TECHNICAL FIELD

The present invention relates to a connector clip. More particularly, the present invention relates to a connector clip, which can improve assembly efficiency and achieve cost down by using a latch that moves in various directions.

BACKGROUND ART

In general, various electric and electronic components are used in a vehicle, and various electric devices are used even in an excavator that is a heavy machine.

Connectors are used to connect the various electric units and the electronic components with each other, and clips which are mounted on a vehicle body or peripheral components to fix the connectors that are used in several places of the vehicle.

In the case of a general clip in the prior art, due to the structural characteristics of the clip, it is difficult to apply a moving latch directly to the clip, and when a connector is fastened to or released from the clip, the connector may be easily damaged to cause inconvenience and a loss in replacing the connector.

Further, the clip in the related art is so configured that only one connector can be fixed to one clip, and thus in the case of fixing two or more connectors to the same position, various shapes of clip fastening structures are required.

In addition, since the clip is fixed to a counterpart component with a bolt, a material having high strength, such as metal, is used, and the manufacturing cost of the clip is increased in comparison to a case where a non-ferrous metal is used.

DISCLOSURE

Technical Problem

Therefore, the present invention has been made to solve the above-mentioned problems occurring in the related art, and one embodiment of the present invention is related to prevention of the damage of a fastening structure of a connector and to facilitation of the release of the connector when the connector is fastened to the clip using a connector fastening structure having the same shape in upper, lower, left, and right directions and a moving latch provided in the clip, in the case where the connector that is included in various kinds of wires and signal cables is mounted using the clip that is fixed to a structure of a vehicle of the construction machine. In addition, one embodiment of the present invention is related to prevention of a structure whereby two connectors can be simultaneously fastened to one click using the fastening structure having the same shape, and the connector can be fixed to the clip in a desired direction without twisting of the wires using the fastening structure having the same shape in left and right directions.

Technical Solution

In accordance with an aspect of the present invention, there is provided a clip for a construction machine used to fix a connector to a structure in a vehicle for a construction machine, which includes a connector body having an engagement hole formed thereon to be engaged with the structure; a connection plate formed to extend from the connector body; a pair of guides formed to extend from one side surface and the other side surface of the connection plate, respectively; a moving latch fixing portion located in the center in the pair of guides and extending from the one side surface and the other side surface of the connection plate, respectively; and a moving latch provided to extend from the one side surface and the other side surface of the moving latch fixing portion, respectively, and having a lower surface formed to keep a predetermined distance from the connection plate.

Advantageous Effect

According to an embodiment of the present invention as described above, first, since the moving latch is applied to the clip, the damage of the connector, which may occur during assembling of the connector onto the clip, can be prevented, a loss, such as replacement of electric and electronic components, can be prevented, and thus durability of the product to which the clip is applied can be improved.

Second, since the fastening structures and moving latches having the same shape are arranged in upper, lower, left, and right directions, the assembly performance of the electric and electronic components can be improved, the number of related components can be reduced, and the manufacturing cost of the product can be lowered with the quality of the product maintained.

BRIEF DESCRIPTION OF THE DRAWINGS

The above objects, other features and advantages of the present invention will become more apparent by describing the preferred embodiments thereof with reference to the accompanying drawings, in which.

\*DESCRIPTION OF REFERENCE NUMERALS IN THE DRAWING

Figure 1:
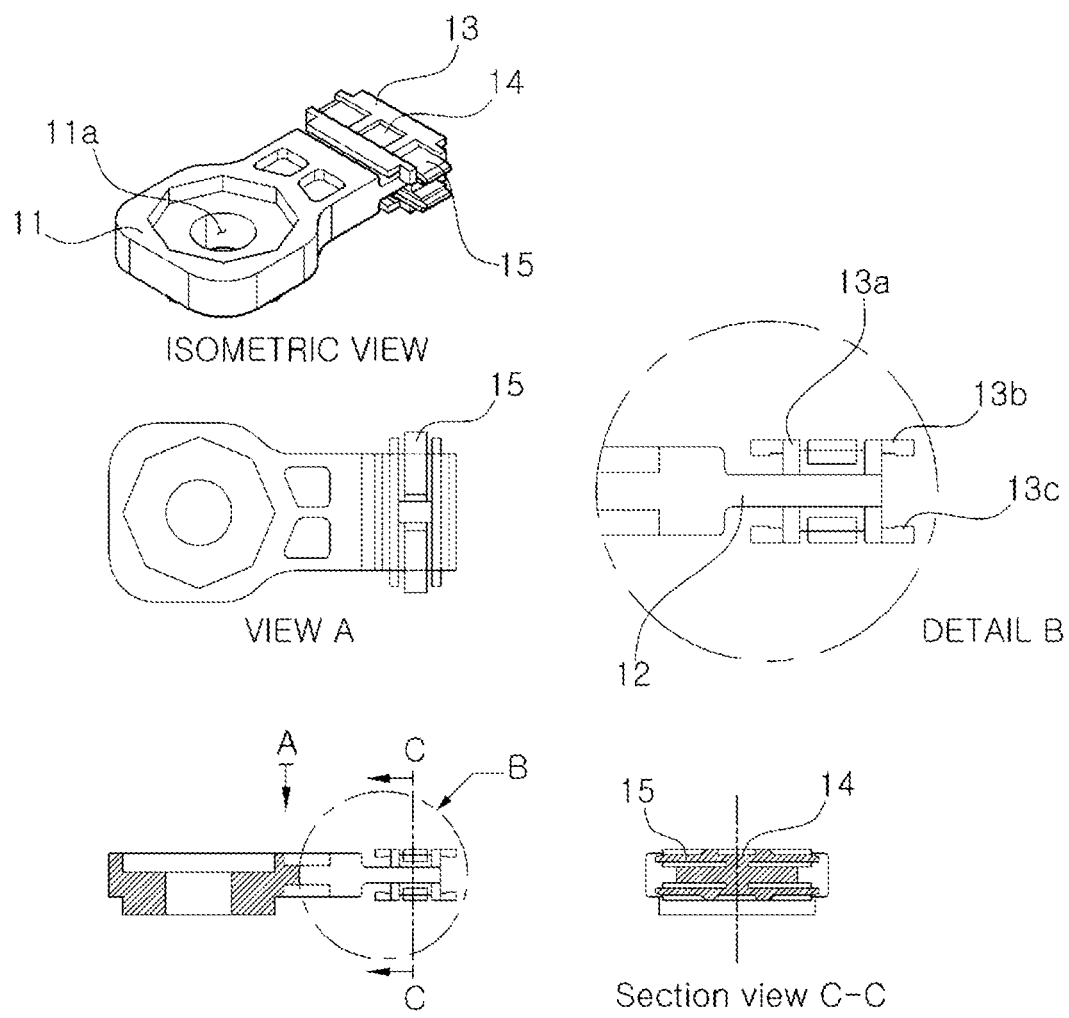
FIG. 1 shows a perspective view, a front view, a plan view, and a cross-sectional view illustrating a clip according to an embodiment of the present invention.

10: clip
11: connector body
11a: engagement hole
12: connection plate
13: guide
13a: first vertical plate 13b: horizontal plate
13c: second vertical plate
14: moving latch fixing portion
15: moving latch
15a: projection piece
15b: extension piece
15c: inclined piece
20: connector
21: channel
22: locking protrusion
30: moving space
40: fastening direction
50: releasing direction

BEST MODE

Now, a clip for a construction machine having a latch that moves in various directions according to a preferred embodiment of the present invention will be described in detail with reference to the accompanying drawings. In the drawings, thicknesses of lines and sizes of constituent elements may be exaggerated for clarity and convenience in explanation.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 2:
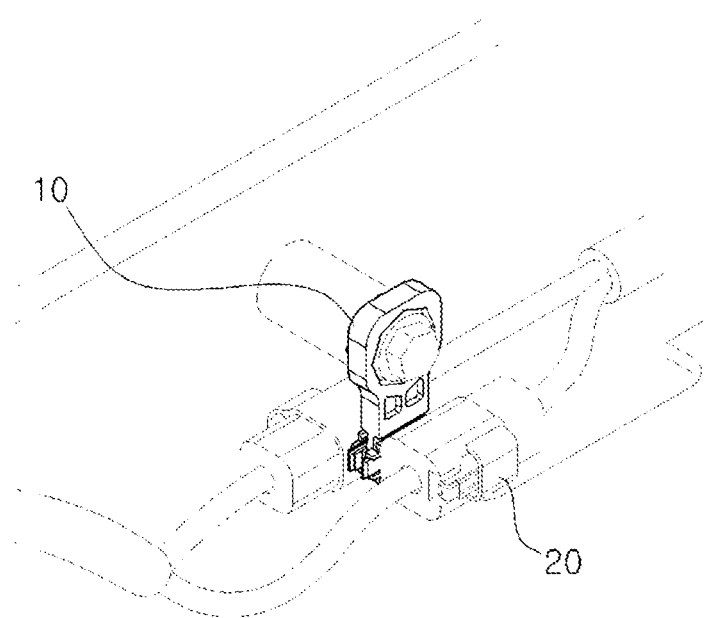
FIG. 2 is a perspective view illustrating a state where a connector is assembled to the clip illustrated in FIG. 1.
Figure 3:
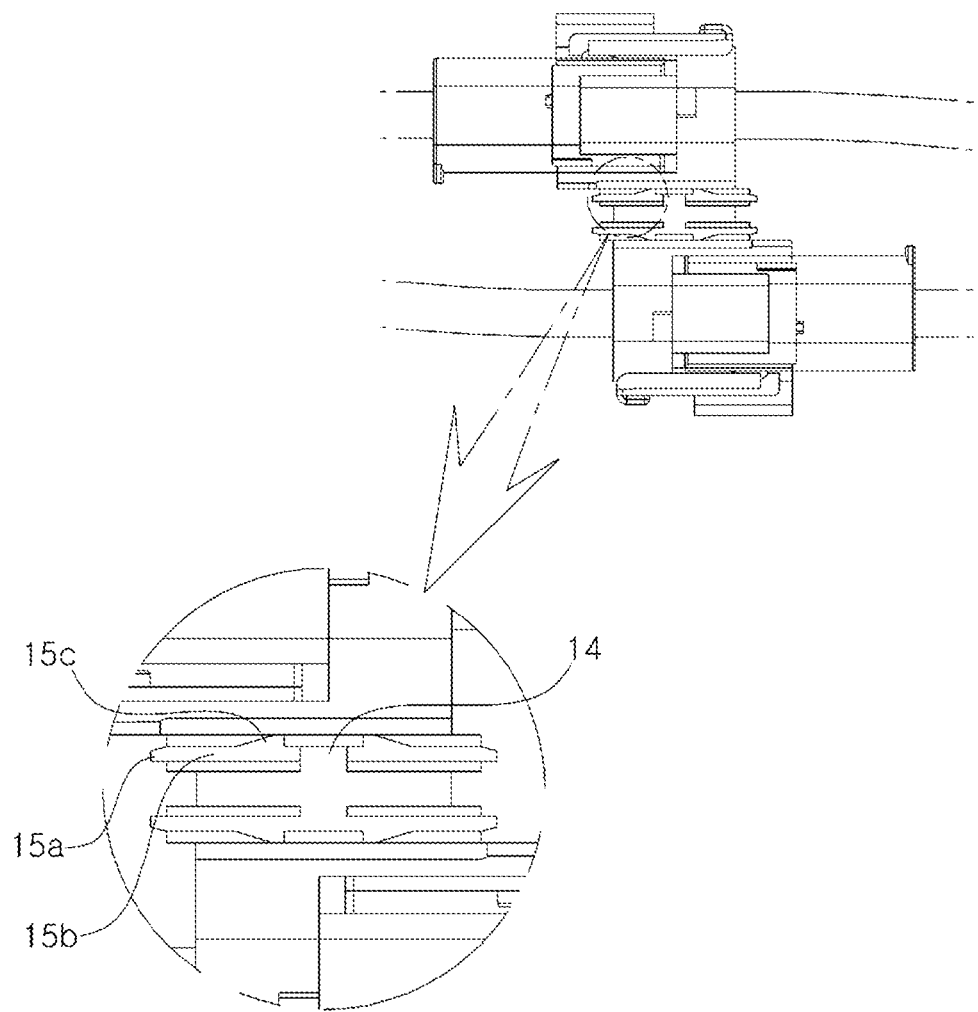
FIG. 3 is a cross-sectional view illustrating a connection portion between the clip and the connector illustrated in FIG. 2.
Figure 4:
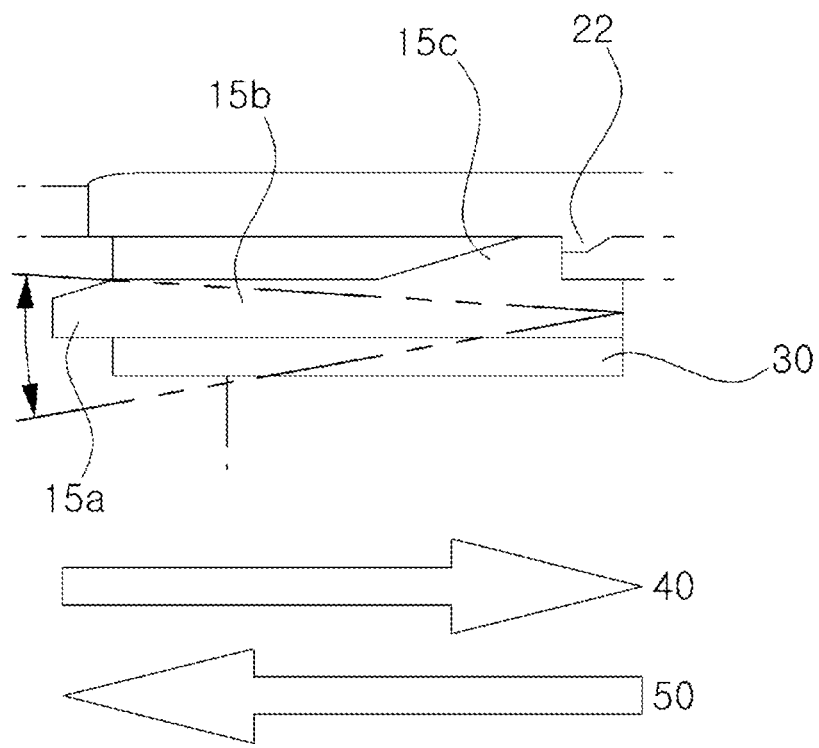
FIG. 4 is a view illustrating a movable space of a moving latch illustrated in FIG. 2.
Figure 5:
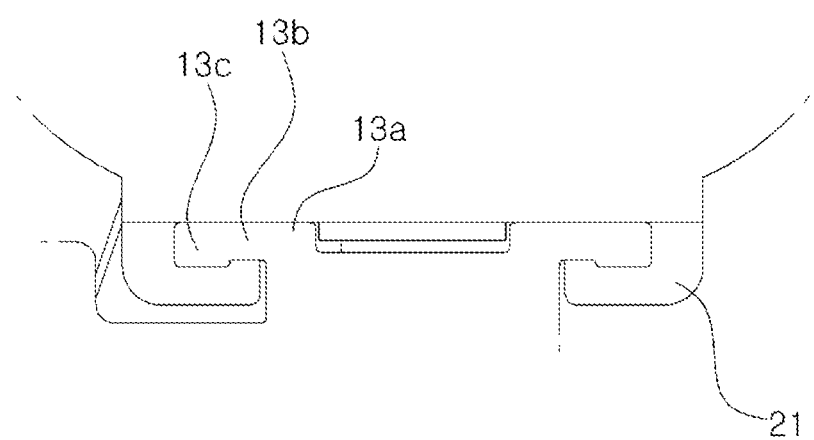
FIG. 5 is a cross-sectional view illustrating a fastening state of the clip and the connector illustrated in FIG. 2.

FIG. 1 shows a perspective view, a front view, a plan view, and a cross-sectional view illustrating a clip according to an embodiment of the present invention. FIG. 2 is a perspective view illustrating a state where a connector is assembled to the clip illustrated in FIG. 1, and FIG. 3 is a cross-sectional view illustrating a connection portion between the clip and the connector illustrated in FIG. 2. FIG. 4 is a view illustrating a movable space of a moving latch illustrated in FIG. 2, and FIG. 5 is a cross-sectional view illustrating a fastening state of the clip and the connector illustrated in FIG. 2.

According to a preferred embodiment of the present invention, a clip 10 for a construction machine used to fix a connector to a structure in a vehicle for a construction machine includes a connector body 11 having an engagement hole 11a formed thereon to be engaged with the structure, a connection plate 12 formed to extend from the connector body 11, a pair of guides 13 formed to extend from one side surface and the other side surface of the connection plate 12, respectively, a moving latch fixing portion 14 located in the center in the pair of guides 13 and extending from the one side surface and the other side surface of the connection plate 12, respectively, and a moving latch 15 provided to extend from the one side surface and the other side surface of the moving latch fixing portion 14, respectively, and having a lower surface formed to keep a predetermined distance from the connection plate 12.

As illustrated in FIG. 1, the clip 10 according to an embodiment of the present invention includes the connector body 11, the connection plate 12, the guide 13, the moving latch fixing portion 14, and the moving latch 15.

As illustrated in FIG. 2, the engagement hole 11a is formed on the connector body 11 to fix the clip 10 to the structure of the vehicle of the construction machine using a bolt or the like. The connector body 11 is formed in a predetermined shape so that the connector body 11 can be fixed to the structure of various types of vehicles.

The connection plate 12 is formed to extend from the connector body 11, and has a flat shape.

The pair of guides 13 are formed to extend from an upper surface and a lower surface of the connection plate 12, respectively, as two guides 13 as a whole.

The moving latch fixing portion 14 is formed between the pair of guides 13, and is located in the center in the length direction of the guides 13.

The moving latch 15 is formed to extend from the one surface and the other surface of the moving latch fixing portion 14 toward the end direction of the guides 13. As a result, the moving latches 15 are formed to have a line of symmetry based on the moving latch fixing portion 14.

As illustrated in FIG. 4, the lower surface of the moving latch 15 is formed to keep a predetermined distance from the connection plate 12, and thus the moving latch 15 can move within the distance range. As a result, when the connector and the clip 10 are fastened to each other, the moving latch 15 moves in an opposite direction to the connector to facilitate the fastening, and when the connector and the clip 10 are released from each other, the moving latch 15 can move to facilitate the releasing. Further, since the moving latch 15 is provided on each of the two guides 13, it is possible to fix two or more connectors for electric and electronic wires to one clip 10.

In the clip 10 according to the preferred embodiment of the present invention, the moving latch 15 includes a projection piece 15a projecting to an outside of the guides 13, an extension piece 15b formed to extend from the projection piece 15a to the moving latch fixing portion 14 and an inclined piece 15c projecting from one end of the extension piece to the end of the guide 13, and having inclination.

As illustrated in FIG. 3, four moving latches 15 are provided on the clip 10, and each of the moving latches 15 includes the projection piece 15a, the extension piece 15b, and the inclined piece 15c.

The projection piece 15a is a portion that projects to the outside of the end of the guide 13. Since the projection piece 15a is provided, it is possible for a user to hold and move the projection piece 15a by the hand when releasing the connector. It is preferable that the end of the projection piece 15a is inclined so that the projection piece 15a can be conveniently held by the hand.

The extension piece 15b is a portion that is formed to extend from the projection piece 15a to the moving latch fixing portion 14.

The inclined piece 15c is a portion that is formed to extend from one end of the extension piece 15b to the end of the guide 13, and has an inclined surface. When the connector is fastened to or released from the clip 10, the connector slides along the inclined piece 15a.

In the clip 10 according to the preferred embodiment of the present invention, the guide 13 includes a pair of first vertical plates 13a extending from one side of the connection plate 12, a horizontal plate 13b formed to extend from an end of the first vertical plate 13a to the outside and a second vertical plate 13c extending downward from the end of the horizontal plate 13b with a height that is lower than that of the first vertical plate 13a.

As illustrated in FIG. 1, each of the pair of the guides 13 includes the first vertical plate 13a, the horizontal plate 13b, and the second vertical plate 13c.

The pair of first vertical plates 13a are formed to extend from the connection plate 12.

The horizontal plate 13b is formed to extend from the end of the first vertical plate 13a to the outside.

The second vertical plate 13c is formed to extend from the end of the first vertical plate 13a, and is in parallel to the first vertical plate 13a. The overall length of the second vertical plate 13c is shorter than the length of the first vertical plate 13a.

In the clip 10 according to the preferred embodiment of the present invention, the connector includes a pair of channels formed to slide along the guides 13; and a locking protrusion 22 located in the center in the pair of channels and formed to slide along the inclined surface of the inclined piece 15c while the connector slides and to lock in one side of the inclined piece 15c.

The connector includes the channel and the locking protrusion 22.

A pair of channels is provided, and the locking protrusion 22 is provided in the center position in the length direction of the pair. The locking protrusion 22 is point symmetrical to the inclined piece 15c so as to be locked in one side of the inclined piece 15c. That is, since the inclined piece 15c is in the shape of a right-angled triangle, the locking protrusion 22 is also in the shape of a right-angled triangle, and their surfaces that correspond to the height of the right-angled triangles become in surface contact with each other.

As illustrated in FIG. 5, the channels are provided to be fitted into the guide 13, and the connector can slide. While the channel is fitted into the guide 13 to slide, the locking protrusion 22 slides along the upper surface of the moving latch 15, and after passing through the inclined surface of the inclined piece 15c, the locking protrusion 22 is locked in one side of the inclined piece 15c. It is preferable that the locking protrusion 22 has a locking groove so that the locking protrusion 22 becomes in contact with the one side of the inclined piece 15c, and as the locking protrusion 22 is fitted into the locking groove, the locking protrusion 22 naturally makes contact with the moving latch 15.

As illustrated in FIG. 2, according to the embodiment of the present invention, it is possible that the connectors are engaged with the lower end surface and the upper end surface of the clip 10. Further, since the engagement of the connector with the lower end surface or the upper end surface of the clip 10 is performed along the moving latch 15, the bidirectional sliding of the connector becomes possible. As a result, two connectors can be fixed to one clip 10, and when the connector is fastened to or released from the clip 10 using the moving latch 15, the connector fastening portion can be prevented from being damaged.

As illustrated in FIG. 4, in the case where the connector moves in the fastening direction 40 and is assembled with the clip 10, the moving latch 15 naturally goes down within the moving space 30 and then returns to its original state, so that the connector can be fastened without damaging the connector fastening portion.

In the case where the connector moves in the releasing direction 50 that is opposite to the fastening direction 40, the connector is not released due to the locking structure of the inclined piece 15c and the locking protrusion 22. However, in the case where the moving latch 15 is moved in the opposite direction to the connector within the range of the moving space 30 using the projection piece 15a, the connector can be released without damaging the fastening structure of the clip 10 and the connector.

INDUSTRIAL APPLICABILITY

As apparent from the above description, the present invention relates to the clip for the construction machine having the latch that moves in various directions, and can be applied to the construction machinery industry fields.

The invention claimed is:

1. A clip for a construction machine that is used to fix a connector to a structure in a vehicle for the construction machine, comprising:
   a mounting having an engagement hole formed thereon to be engaged with the structure;
   a connection plate formed to extend from the mounting;
   a pair of guides formed to extend from one side surface and an other side surface of the connection plate, respectively;
   a moving latch fixing portion located in a center in the pair of guides and extending from the one side surface and the other side surface of the connection plate, respectively; and
   a moving latch provided to extend from the one side surface and the other side surface of the moving latch fixing portion, respectively, and having a lower surface formed to keep a predetermined distance from the connection plate,
   wherein the moving latch includes;
   a projection piece projecting to an outside of the guides;
   an extension piece formed to extend from the projection piece to the moving latch fixing portion; and
   an inclined piece projecting from one end of the extension piece to an end of the guide, and having inclination, and the connector includes;
   a pair of channels formed to slide along the guides; and
   a locking protrusion located in the center in the pair of channels and formed to slide along an inclined surface of the inclined piece while the connector slides and to lock in one side of the inclined piece.

2. The clip for a construction machine according to claim 1, wherein each of the pair of guides comprises:
   a pair of first vertical plates extending from one side of the connection plate;
   a horizontal plate formed to extend from an end of the vertical plate to the outside; and
   a second vertical plate extending downward from the end of the horizontal plate with a height that is lower than that of the first vertical plate.

* * * * *